Patented July 1, 1947

2,423,364

UNITED STATES PATENT OFFICE 2,423,364

PROCESS FOR BREAKING PETROLEUM EMULSIONS

Charles M. Blair, Jr., Webster Groves, and Dale M. Schulz, St. Louis, Mo., assignors to Petrolite Corporation, Ltd., Wilmington, Del., a corporation of Delaware No Drawing. Application December 10, 1943, Serial No. 513,785

11 Claims. (Cl. 252—342)

This invention relates primarily to the treatment of emulsions of mineral oil and water, such as petroleum emulsions, for the purpose of separating the oil from the water.

One object of our invention is to provide a novel process for resolving petroleum emulsions of the water-in-oil type, that are commonly referred to as "cut oil," "roily oil," and "emulsified oil," etc., and which comprises fine droplets of naturally-occurring waters or brines dispersed in a more or less permanent state throughout the oil which constitutes the continuous phase of the emulsion.

Another object of our invention is to provide an economical and rapid process for separating emulsions which have been prepared under controlled conditions from mineral oil, such as crude petroleum and relatively soft waters or weak brines. Controlled emulsification and subsequent demulsification, under the conditions just mentioned, is of significant value in removing impurities, particularly inorganic salts from pipeline oil.

The new composition of matter herein described, which constitutes the demulsifying agent of our improved process for resolving petroleum emulsions, constitutes a class of high molecular weight esters and ester acids together with their salts.

We have found that if one introduces a certain new functional group or groups into the chemical compound or condensation product of an alpha-beta ethylenic acid or anhydride with an unsaturated, non-conjugated, non-hydroxylated fatty acid, one obtains a material or substance that is particularly effective for use as a demulsifier for petroleum emulsions, as well as offering similar advantages for other purposes. In the present instance, the invention is concerned with a sub-genus or species of a broad class of materials, which contains a repetitious oxyalkylene radical in which there are at least 4 and not more than 20 occurrences of the ether linkage, and with the added proviso that any residual hydroxy radical shall not be esterified in turn with a high molal detergent-forming acid. Such functional group or radical appears to cooperate in some non-obvious manner with the remainder of the molecule to yield a product which is unusually effective as a demulsifying agent.

Briefly stated, such compounds are obtained by esterification with polyethylene glycols or the equivalent, such as nonaethylene glycol, or by reaction with alkylene oxide containing a reactive ethylene oxide ring, such as ethylene oxide, propylene oxide, butylene oxide, glycide, methylglycide, etc.

Such reactions of the kind just indicated, to wit, esterification or oxyalkylation, result in a terminal hydroxyl radical. As is hereinafter indicated, such hydroxyl radical may be esterified with various polycarboxy acids, as described, or with monocarboxy acids having 8 carbon atoms or less, such as octanoic, hexanoic, acetic, hydroxy-acetic, lactic acid, etc. Similarly, the hydroxyl hydrogen atom may be replaced with an alkyl radical, preferably having 8 carbon atoms or less. The most convenient manner of conducting such reaction is to treat octyl alcohol or methyl alcohol in a conventional manner with an alkylene oxide, such as ethylene oxide, so as to obtain the alkyl oxyalkylene glycol having a single terminal hydroxyl radical, and reacting such alkyl polyalkylene glycol or alcoholic polyether with a free carboxyl radical of the carboxylated condensation product. If desired, the same procedure can be applied to the low molal acids, so as to give a hydroxylated fractional ester; for instance, nonaethylene glycol monoacetate, nonaethylene glycol monobutyrate, or an equivalent. The acidic condensation product with which these di- or polyhydric alcohols containing the repetitious ether linkages are reacted, will be hereinafter described in detail.

As mentioned previously, these condensation products are themselves polybasic acids or anhydrides. It has recently been disclosed in U. S. Patents Nos. 2,188,882 to 2,188,890, inclusive, dated January 30, 1940, to Clocker, and in "Oil and Soap," by Bickford et al., in the February 1942 issue, at pages 23 et seq., that these products may be obtained by heating the reactants at a suitably elevated temperature, usually above 200° C., and sometimes at temperatures above 300° C. The alpha-beta ethylenic acids or anhydrides which are suitable for use in this aforementioned condensation with non-conjugated, unsaturated, non-hydroxylated, fatty acids, are those containing less than 10 carbon atoms, and are exemplified by crotonic acid, maleic acid, fumaric acid, citraconic acid, glutaconic acid, acrylic acid, maleic anhydride, citraconic anhydride, etc.

Suitable non-conjugated, unsaturated, non-hydroxylated, fatty acids for use in condensation reactions with the above-mentioned alpha-beta ethylenic acids, are those containing from 10 to 24 carbon atoms in their carbon chains, and include undecylenic acid, oleic acid, elaidic acid, linoleic acid, linolenic acid, erucic acid, dibasic diricinoleic acid, acetalized ricinoleic acid esters, etc.

Actually, as pointed out by Clocker in the above mentioned patents, the esters of these acids, such as the triglycerides or the esters of mono- or di- or other polyhydric alcohols, may be employed in this condensation in place of the fatty acid itself. For the production of demulsifiers contemplated by our process, we usually prefer to employ a condensation product derived from a glyceride containing in esterified form a large proportion of non-conjugated, unsaturated, non-hydroxylated, fatty acid. Examples of such glycerides are olive oil, corn oil, cottonseed oil, soyabean oil, linseed oil, rapeseed oil, perilla oil, cranberryseed oil, teaseed oil, etc.

When glycerides or other esters of the non-conjugated, unsaturated, non-hydroxylated fatty acids are employed in the condensation reaction, the final product is not necessarily a polybasic acid or anhydride, since a monocarboxy, alpha-beta ethylenic acid, such as crotonic acid, may have been employed in the condensation. However, such monobasic acid condensation products are intended to be included when reference is made to a polybasic carboxy acid or anhydride reactant used in preparing the demulsifiers contemplated by our present invention. Actually, they are the partial esters of dibasic acids, and under certain conditions, may function as polybasic acids by interchange of the alcohol residue with a hydroxyl-containing reactant. This aspect is clarified by contemplating the final product as derived from a polybasic carboxy acid, in which one carboxy radical is part of an unsaturated, non-conjugated, higher fatty acid, as described. The other carboxy radical or radicals, are derived from the alpha-beta ethylenic acid.

For the sake of convenience and clarity, the reactants which are derived as described above by condensation of an alpha-beta ethylenic carboxy acid with a non-conjugated, unsaturated, non-hydroxylated, fatty acid or fatty acid ester, will be referred to below as Clocker adducts. Previous reference has been made to the fact that the functional group which characterizes the herein contemplated sub-genus or species, contains a repetitious ether linkage in which the carbon atom chain is interrupted at least 4 times with an oxygen atom and not more than 20 times. It has also been pointed out that such products may be obtained by esterification or oxyalkylation. As a matter of convenience, we prefer to employ esterification, and particularly, reactants having approximately 8 to 12 oxyalkylene groups, as, for example, 8 to 12 oxyethylene groups. Our preference to use the oxyethylated compounds, is due largely to the fact that they are commercially available, and particularly so in two desirable forms. The most desirable form is the so-called nonaethylene glycol, which, although consisting largely of nonaethylene glycol, may contain small amounts of heptaethylene and octaethylene glycols, and possibly minor percentages of the higher homologs. Such glycols represent the upper range of distillable glycols; and they may be conveniently referred to as "upper distillable ethylene glycols". There is no particularly good procedure for making a sharper separation on a commercial scale; and it is understood that mixtures of one or more of the glycols may be employed, as well as a single glycol. As pointed out, it is particularly preferred to employ nonaethylene glycol as commercially available, although it is understood that this product contains other homologs, as indicated. Substantially as desirable as the upper distillable polyethylene glycols, are the lower non-distillable polyethylene glycols. These materials are available in the form of a waxy water-soluble material, and the general range may vary somewhat from deca- to tetradecaethylene glycol. As is well understood, the method of producing such glycols would cause some higher homologs to be formed; and thus, even in this instance, there may be present some oxyethylene glycols within the higher range above indicated. One need not point out that these particular compounds consist of mixtures, and that in some instances, particularly desirable esters are obtained by making mixtures of the liquid nonaethylene glycol with the soft, waxy, lower non-distillable polyethylene glycols. For the sake of convenience, reference in the examples hereinafter given will be to nonaethylene glycol; and calculations will be based on a theoretical molecular weight of 414. Actually, in manufacture, the molecular weight of the glycol employed, whether a higher distillable polyethylene glycol, or a lower non-distillable polyethylene glycol, or a mixture of the same, should be determined and reaction conducted on the basis of such determination, particularly in conjunction with the hydroxyl or acetyl value.

The manufacture of typical Clocker adducts are illustrated by the following examples:

Acidic Clocker Adduct

*Example A*

880 lbs. of linseed oil was heated with 295 lbs. of maleic anhydride while stirring under an air condenser. The temperature was raised to 250° C. and held for 2 hours. Constant agitation was employed during the course of reaction. The progress of the reaction was noted by determination of the maleic anhydride number, i. e., the extent to which the maleic anhydride or its equivalent has disappeared by the formation of an adduct. See Berichte der Deutschen Chemische Gesellschaft, volume 70, part B, page 903, et seq. (1937), and Analyst, volume 61, page 812 (1936). If the reaction is incomplete at the end of 2 hours, as indicated by any suitable analytical procedure, one continues heating and agitating until the reaction is complete, or substantially complete.

Acidic Clocker Adduct

*Example B*

880 lbs. of soyabean oil was heated with 196 lbs. of maleic anhydride while stirring under an air condenser. The temperature was held at 250° C. for two hours.

Acidic Clocker Adduct

*Example C*

Teaseed (olive) oil was substituted for the soyabean oil in Example B.

Acidic Clocker Adduct

*Example D*

232 lbs. of fumaric acid was substituted for the 196 lbs. of maleic anhydride in Example B.

Acidic Clocker Adduct

*Example E*

224 lbs. of citraconic anhydride was substituted for the 196 lbs. of maleic anhydride in Example B.

Acidic Clocker Adduct

*Example F*

300 lbs. of "Indusoil" (crude talloil acids) was heated at 250° C. for 2 hours, with 150 lbs. of maleic anhydride.

Acidic Clocker Adduct

*Example G*

282 lbs. of oleic acid was heated with 98 lbs. of maleic anhydride for 2 hours at 250° C.

ACIDIC CLOCKER ADDUCT

Example H 580 lbs. of sperm oil was substituted for the 880 lbs. of soyabean oil in Example B.

ACIDIC CLOCKER ADDUCT

Example I

In examples A to H, preceding, the various oils were replaced by an equivalent weight of fatty acids, for instance, 880 lbs. of linseed oil was replaced by 842 lbs. of linseed oil fatty acids.

ACIDIC CLOCKER ADDUCT

Example J

Products of the kind described in Examples A to H, preceding, were saponified with a slight excess of caustic potash and then acidified with a slight excess of 50% sulfuric acid, so as to yield products substantially identical with those described in Example I, preceding.

ACIDIC CLOCKER ADDUCT

Example K

The various glycerides previously described were replaced by an equivalent amount of esters derived from a low molal alcohol, for instance, the ester derived from methyl, ethyl, propyl, or butyl alcohols or cyclic alcohols, such as benzyl alcohol, cyclohexanol, etc. Such esters are obtained in the conventional manner by esterification between the fatty acids and the selected alcohol. As an example, 880 lbs. of linseed oil employed in Example A, preceding, were replaced by 1010 lbs. of the butyl ester of linseed oil fatty acid.

Having obtained the acidic Clocker adducts of the kind exemplified by the preceding examples, the next step consists in subjecting the same to an esterification or oxyalkylation process; thereby producing a new material or compound, of which the following are examples:

COMPOSITION OF MATTER

Example 1

The Clocker adduct was prepared from soyabean oil and maleic anhydride, as described in Example B. To 1075 lbs. of the adduct was added 800 lbs. of nonaethylene glycol. The mixture was stirred and heated at a temperature of 250° for 5 hours. If desired, a dried inert gas may be passed through the reaction mass. The progress of the reaction may be noted by a decrease in acid number, reduction of available hydroxyl value, or both. In any event, if reaction is not complete, additional time of reaction may be employed.

The product was a viscous, red oil, soluble in dilute sodium hydroxide, slightly soluble in water and insoluble in kerosene.

COMPOSITION OF MATTER

Example 2

560 lbs. of hexaethylene glycol was substituted for the 800 lbs. of nonaethylene glycol in Example 1.

COMPOSITION OF MATTER

Example 3

400 lbs. of tetraethylene glycol was substituted for the 800 lbs. of nonaethylene glycol in Example 1.

COMPOSITION OF MATTER

Example 4

886 lbs. of decaethylene glycol was substituted for the 800 lbs. of nonaethylene glycol in Example 1.

COMPOSITION OF MATTER

Example 5

The Clocker adduct was prepared from sperm oil and maleic anhydride, as described in Example H. To 775 lbs. of this adduct was added 800 lbs. of nonaethylene glycol. The mixture was held at 250° for one hour.

The product was a viscous red, oil. It was colloidally soluble in dilute sodium hydroxide. It was a very effective demulsifier for certain petroleum emulsions produced in Texas fields.

COMPOSITION OF MATTER

Example 6

The product of Example 5 was neutralized with monobutyl amine. The amine was added slowly until a portion of the product dispersed in water gave a slightly alkaline reaction with litmus paper.

COMPOSITION OF MATTER

Example 7

The Clocker adduct of Example E was substituted for the soyabean oil-maleic anhydride adduct in Example 1.

COMPOSITION OF MATTER

Example 8

One pound mole of glycerol was treated in the conventional manner with 18 lb. mols of ethylene oxide. The trihydric alcohol so obtained was substituted in equivalent molar ratio for nonaethylene glycol in Example 1, preceding.

COMPOSITION OF MATTER

Example 9

One pound mole of nonaethylene glycol was treated with two pound moles of glycide to form the tetrahydric alcohol. The tetrahydric alcohol so obtained was substituted in equivalent molar ratio for nonaethylene glycol in Example 1, preceding.

COMPOSITION OF MATTER

Example 10

One pound mole of the Clocker adduct prepared in Example A was reacted with ethylene oxide in the proportion of 18 lb. moles of ethylene oxide for each pound of maleic anhydride employed in the manufacture of the adduct. Such reaction was conducted in the conventional manner used in oxyalkylation of high molal acids or glycerides, i. e., the procedure employed for oxyalkylation of oleic acid, olein, octadecyl alcohol, and the like. A catalyst consisting of one-fourth of 1% of sodium methylate was employed. The temperature of reaction varied from 125 to 200° C.; the ethylene oxide was added in stepwise portions. The gauge pressure varied from 75 to 250 lbs. per square inch. Constant agitation was employed during oxyalkylation. The reaction required approximately 20 to 48 hours for complete reaction. The end of the reaction was determined by the fact that substantially all of the ethylene oxide used as a reactant disappeared and there was a corresponding reduction in the acid value.

Composition of Matter

Example 11

The same procedure was employed as in Example 10, preceding, except that adducts exemplified by Examples B to H, preceding, were substituted for the adduct employed as a reactant in Example 10, preceding.

Composition of Matter

Example 12

The same procedure was employed as in Example 10, preceding, except that the adduct described in Example I or Example J, was substituted for the adduct employed as a reactant in Example 10.

Reference to such esterification reaction of the kind previously described contemplates that it shall be carried to completion, or substantial completion, from the standpoint of the desired ester. As will be pointed out hereinafter, such ester may be essentially a monomer, a dimer, a trimer, or higher polymer. Completion of reaction, or substantial completion, does not mean that all available hydroxyl radicals need be eliminated by reaction with carboxyl radicals, if the latter are in excess, or vice versa. Completion of the reaction may only involve the formation of a single ester linkage; i. e., the reaction of one carboxyl with one hydroxyl radical. In any event, the final product of reaction is subresinous or balsam-like, in character.

Previous references were made to the fact that a carboxyl radical may be permitted to remain as such, i. e., in the unneutralized state, or may be neutralized in any suitable manner by means of a base such as caustic soda or the like, or by means of an amine. Similarly, any residual hydroxyl radical may remain as such or be reacted with a low molal monocarboxy acid. Similarly, the hydrogen atom of a residual or terminal hydroxyl radical may be replaced by a low molal alkyl radical. It has been previously pointed out that from a practical standpoint this is best accomplished by treating a low molal alcohol, such as methyl alcohol, ethyl alcohol, or octyl alcohol with ethylene oxide or its equivalent. Such reactant, for instance, methyl or octyl nonaethylene glycol, or nonaethylene glycol monoacetate, represents essentially a monohydric alcohol.

In the broadest aspect, then, the new composition of matter herein described, which is used as the demulsifier of our process for resolving petroleum emulsions is an esterified adduct, being a member of the class consisting of complete esters, acid esters and ester salts; said adduct being an acyclic alpha-beta unsaturated acid having not over 10 carbon atoms combined at an intermediate point in the carbon atom chain of a non-conjugated, unsaturated, non-hydroxylated, fatty acid acyl radical having at least 8 carbon atoms and not over 32 carbon atoms; said esterified adduct containing at least one occurrence of the radical —COO.($C_nH_{2n}O$)$_m$H in which $n$ represents the numerals 2 to 4, and $m$ the numerals 4 to 20.

Examination of the preceding paragraph indicates that actually the scope is somewhat larger than this aspect. The terminal alcoholic hydrogen atom indicated in the preceding structural formula may be replaced by a low molal acyl radical or alkyl radical having not over 8 carbon atoms. Such acyl radicals include benzoic, methyl benzoic, and hydrogenated derivatives, i. e., alicyclic analogs. Similarly, the alkylene oxide, indicated by the formula $C_nH_{2n}O$, must include glycide and methylglycide; this in turn may be considered hydroxy propylene oxide, or hydroxy butylene oxide. It is understood in the hereto appended claims, reference to the alkylene oxide includes these two hydroxy alkylene oxides or their equivalents.

A more narrow aspect and preferred aspect of the present invention, is illustrated by examples where the alcohol is polyfunctional. The adduct is always polyfunctional, due to the presence of anhydride radicals, or ester radicals, insofar that either radical is in essence a combined or potentially available carboxyl radical. If a glyceride, for instance, linseed oil, is reacted with 3 moles of maleic anhydride, 6 potential carboxyl radicals are introduced into the molecule. Occasionally more than 3 maleic anhydride radicals, and probably as many as 6 maleic anhydride radicals, can be so introduced. In any event, there is always a large plurality of carboxyl or potential carboxyl radicals present. Treatment of one mole of nonaethylene glycol with at least 2 moles of glycide, or treatment of a mole of acyclic diglycerol with 20 to 30 moles of ethylene oxide, illustrates a type of polyhydroxylated alcohols containing the required number of repetitious ether linkages.

The alcohol containing the repetitious ether linkage, as previously described, may be considered for the sake of simplicity as just an ordinary alcohol, as far as esterification is concerned. Stated another way, one may temporarily ignore the repetitious ether linkage, and thus the reactant may be considered as a monohydric alcohol or polyhydric alcohol.

If an alcohol is indicated by the formula Y'(OH)$_n$, where $n$ indicates the number 1 or more, and if a polybasic acid body be indicated by the formula X'(COOH)$_n$, where $n$ indicates the number 2 or more, then the reaction between a monohydric alcohol and a polybasic acid will result in a compound which may be indicated by the following formula: YX(COOH)$_{n'}$ wherein $n'$ indicates the number 1 or more, and which is in reality a contraction of a more elaborate structural formula, in which X' and Y' are joined by a carboxyl radical or residue. Assuming, however, as would be true in the majority of cases, that the alcohol actually would be a polyhydric alcohol, and that the acid body is polybasic in nature, then examination reveals that the formula might result in a combination in which there were neither residual carboxyl radicals, nor residual hydroxyl radicals, or might result in compounds in which there were residual hydroxyl radicals, and no residual carboxyl radicals, or compounds where there might be residual carboxyl radicals and no residual hydroxyl radicals; or there might be both. This is indicated by the following:

(Y.X)$_q$(OH)$_{n'}$
(Y.X)$_q$(COOH)$_{m'}$
(OH)$_{n''}$(YX)$_q$(COOH)$_{m''}$ in which $q$ indicates a small whole number (one in the case of a monomer, and probably not over 20, and usually less than 10) and $m'$ and $n'$ indicate the number 1 or more, and $m''$ and $n''$ indicate zero or a small or moderately-sized whole number, such as zero, one or more, but in any event, probably a number not in excess of 40; for instance, as would be indicated by a molecule which involved 6 to 1 moles of a polyhydric alcohol. Naturally, each residual hydroxyl could combine with a dibasic adduct, or with a similar compound, which is essentially a tribasic acid, if derived from an acid such as maleic acid; and in such event, there would be a large number of free or uncombined carboxyl radicals present, and especially if derived from a trimaleated glyceride. Actually, the preferable type of reagent would be more apt to include less than 20, and in fact, less than 10 free hydroxyl radicals. It is not necessary to remark that the residual carboxyl radicals can be permitted to remain as such, or can be neutralized in any suitable manner, such as conversion into salts, esters, amides, amino esters, or any other suitable form. Usually, such conversion into salt form would be by means of sodium hydroxide, potassium hydroxide, calcium hydroxide, magnesium hydroxide, ammonium hydroxide, amylamine, butanolamine, ethanolamine, diethanolamine, triethanolamine, cyclohexanolamine, benzylamine, aniline, toluidine, etc. Conversion into the ester would be by means of a monohydric or polyhydric alcohol, such as methyl alcohol, ethyl alcohol, propyl alcohol, butyl alcohol, hexyl alcohol, octyl alcohol, decyl alcohol; ethylene glycol, diethylene glycol; glycerol, diglycerol, triethylene glycol, or the like. One could employ an amino alcohol so as to produce an ester.

If a tricarboxy acid, such as a maleic anhydride adduct, is employed, then at least theoretically three moles of the alcohol might react with one mole of the acid compound. Similarly, as has already been pointed out, a large number of molecules of such polybasic acid adduct might combine with a single molecule of a highly hydroxylated reactant. For practical purposes, however, we have found that the most desirable products are obtained by combinations in which the ratio of alcoholic body to the polybasic acid is within the ratio of 3 to 1 and 1 to 5, and in which the molecular weight of the resultant product does not exceed 10,000, and is usually less than 5,000, or perhaps less than 3,000. This is particularly true, if the resultant product is soluble to a fairly definite extent, for instance, at least 5% in some solvent such as water, alcohol, benzene, dichlorethyl ether, acetone, cresylic acid, or the like. This is simply another way of stating that it is preferable, if the product be one of the sub-resins, which are commonly referred to as an A resin, or a B resin, as distinguished from a C resin, which is a highly infusible, insoluble resin (see Ellis, Chemistry of Synthetic Resins, 1935, page 862 et seq.).

In recapitulating what has been said previously, the sub-resinous, semi-resinous, or resinous product herein contemplated as the preferred type may be indicated by the following formula:

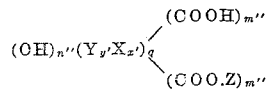

in which the characters have their previous significance, and $y'$ represents a small whole number not greater than 3, and $x'$ represents a small whole number not greater than 5; Z represents a hydrogen ion equivalent, such as a metallic atom, organic radical, etc.

When used as demulsifiers for petroleum emulsions, the products or materials herein described, may be employed as such, or in admixture with other demulsifiers, etc.

It is well known that conventional demulsifying agents may be used in a water-soluble form, or in an oil-soluble form, or in a form exhibiting both oil and water solubility. Sometimes they may be used in a form which exhibits relatively limited oil solubility. However, since such reagents are sometimes used in a ratio of 1 to 10,000, or 1 to 20,000, or even 1 to 30,000, such an apparent insolubility in oil and water is not significant, because said reagents undoubtedly have solubility within the concentration employed. This same fact is true in regard to the material or compounds employed as the demulsifying agent of our process.

We desire to point out that the superiority of the reagent or demulsifying agent contemplated in our process is based upon its ability to treat certain emulsions more advantageously and at a somewhat lower cost than is possible with other available demulsifiers or conventional mixtures thereof. It is believed that the particular demulsifying agent or treating agent herein described will find comparatively limited application, so far as the majority of oil field emulsions are concerned; but we have found that such a demulsifying agent has commercial value, as it will economically break or resolve oil field emulsions in a number of cases which cannot be treated as easily or at so low a cost with the demulsifying agents heretofore available.

In practising our process, a treating agent or demulsifying agent of the kind above described is brought into contact with or caused to act upon the emulsion to be treated in any of the various ways, or by any of the various apparatus now generally used to resolve or break petroleum emulsions with a chemical reagent, the above procedure being used either alone, or in combination with other demulsifying procedure, such as the electrical dehydration process.

The demulsifier herein contemplated may be employed in connection with what is commonly known as down-the-hole procedure, i. e., bringing the demulsifier in contact with the fluids of the well at the bottom of the well or at some point prior to their emergence. This particular type of application is decidedly feasible when the demulsifier is used in connection with acidification of calcareous oil-bearing strata, especially if suspended in or dissolved in the acid employed for acidification.

It should be pointed out that acids and anhydrides are chemically equivalent, and that any reference herein or in the claims to one or the other is meant to include both the acid and its corresponding anhydride.

In some of the above examples, adducts of maleic anhydride with sperm oil have been employed. Chemical evidence indicates that the reaction of maleic anhydride with esters of unsaturated, long chain alcohols, such as sperm oil, involves the addition of maleic anhydride to the chain of the alcohol in a manner analogous to the addition of maleic anhydride to the chain of unsaturated, non-conjugated, non-hydroxylated fatty acids. Interesting demulsifiers may be prepared from the adducts of unsaturated alcohols such as oleyl acetate, oleyl stearate, Jojoba nut oil alcohol esters, and the like, with maleic anhydride or other alpha-beta ethylenic acids or anhydrides containing less than 10 carbon atoms. These products are prepared by the same manufacturing methods described herein for the present compounds and have utility in the same arts and process as the derivatives of the unsaturated fatty acid adducts of the present application, However, this application is not intended to cover compositions prepared from such adducts. Further work on the utilization of unsaturated alcohol adducts is contemplated.

Attention is directed to the additional copending application of Charles M. Blair, Jr., Serial No. 513,784, filed December 10, 1943.

Demulsification, as contemplated in the hereto appended claims, includes the preventive step of commingling the demulsifier with an aqueous component, which would or might subsequently become either phase of the emulsion, in absence of such precautionary measure.

Reference is made to our divisional application Serial No. 547,816, filed August 2, 1944, wherein the materials used as the demulsifier in our herein described process, are claimed as new compositions of matter.

Having thus described our invention, what we claim as new and desire to secure by Letters Patent is:

1. A process for resolving petroleum emulsions of the water-in-oil type, characterized by subjecting the emulsions to the action of a demulsifying agent comprising a sub-resinous esterified adduct, being a member of the class consisting of complete esters, acid esters and ester salts; said adduct being an acyclic alpha-beta unsaturated acid having not over 10 carbon atoms combined at an intermediate point in the carbon atom chain of a non-conjugated, unsaturated, non-hydroxylated, fatty acid acyl radical having at least 8 and not over 32 carbon atoms; said esterified adduct containing at least one occurrence of the radical $$-COO.(C_nH_{2n}O)_{m''}Z'$$

in which $n$ represents the numerals 2 to 4, $m''$ the numerals 4 to 20, and $Z'$ is a member of the class consisting of alkyl radicals and acyl radicals having not over 8 carbon atoms.

2. A process for resolving petroleum emulsions of the water-in-oil type, characterized by subjecting the emulsion to the action of a demulsifier, comprising a sub-resinous esterification product of the formula type:

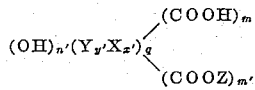

in which $y'$ represents a whole number varying from 1 to 3, and $x'$ represents a whole number varying from 1 to 5, and $n'$, $m$ and $n'$ indicate the numerals 0 to 40; $q$ indicates a small whole number from 1 to 20; Z is a hydrogen ion equivalent; Y is a residue or radical derived from a polyhydric alcohol containing at least one occurrence of the radical $$-COO.(C_nH_{2n}O)_{m''}Z'$$

in which $n$ represents the numerals 2 to 4, $m''$ the numerals 4 to 20, and $Z'$ is a member of the class consisting of hydrogen atoms, alkyl radicals and acyl radicals having not over 8 carbon atoms; and X is a carboxylic adduct radical; said adduct being an acyclic alpha-beta unsaturated acid having not over 10 carbon atoms combined at one intermediate point in the carbon atom chain of a non-conjugated, unsaturated, non-hydroxylated, fatty acid acyl radical having at least 8 carbon atoms and not over 32 carbon atoms.

3. The process of claim 1, wherein $n$ is the numeral 2.

4. The process of claim 2, wherein $n$ is the numeral 2 and $m''$ represents the numerals 7 to 14.

5. The process of claim 2, wherein $n$ is the numeral 2, $m''$ the numerals 7 to 14, and the adduct being that of a polybasic alpha-beta unsaturated acid.

6. The process of claim 2, wherein $n$ is the numeral 2, $m''$ the numerals 7 to 14, and the adduct being that of a polybasic alpha-beta unsaturated acid having not over 6 carbon atoms.

7. The process of claim 2, wherein $n$ is the numeral 2, $m''$ the numerals 7 to 14, and the adduct being that of a polybasic alpha-beta unsaturated acid having not over 6 carbon atoms and in which Z is a hydrogen atom.

8. The process of claim 2, wherein $n$ is the numeral 2, $m''$ the numerals 7 to 14, and the adduct being that of a polybasic alpha-beta unsaturated acid having not over 6 carbon atoms and in which Z is a hydrogen atom and the fatty acyl radical has 18 carbon atoms.

9. The process of claim 2, wherein $n$ is the numeral 2, $m''$ the numerals 7 to 14, and the adduct being that of a polybasic alpha-beta unsaturated acid having not over 6 carbon atoms and in which Z is an hydrogen atom and the fatty acid acyl radical is a linoleyl radical.

10. The process of claim 2, wherein $n$ is the numeral 2, $m''$ the numerals 7 to 14, and the adduct being that of a polybasic alpha-beta unsaturated acid having not over 6 carbon atoms and in which Z is an hydrogen atom and the fatty acid acyl radical is a linolenyl radical.

11. The process of claim 2, wherein $n$ is the numeral 2, $m''$ the numerals 7 to 14, and the adduct being that of a polybasic alpha-beta unsaturated acid having not over 6 carbon atoms and in which Z is an hydrogen atom and the fatty acid acyl radical is an oleyl radical.

CHARLES M. BLAIR, JR.
DALE M. SCHULZ.

REFERENCES CITED

The following references are of record in the file of this patent:

UNITED STATES PATENTS

| Number | Name | Date |
|---|---|---|
| 2,188,888 | Clocker | Jan. 30, 1940 |
| 2,214,784 | Wayne | Sept. 17, 1940 |
| 2,280,862 | Sorenson | Apr. 28, 1942 |
| 2,306,281 | Rust | Dec. 22, 1942 |
| 2,312,731 | Salathiel | Mar. 2, 1943 |
| 2,318,034 | Wayne | May 4, 1943 |
| 2,322,494 | Wirtel | June 22, 1943 |